United States Patent
Dieringer (10) Patent No.: US 9,042,944 B2
(45) Date of Patent: May 26, 2015

(54) COMMUNICATION SYSTEM FOR HELMETED USER

(71) Applicant: Michael D. Dieringer, Rolling Hills, CA (US)

(72) Inventor: Michael D. Dieringer, Rolling Hills, CA (US)

(*) Notice: Subject to any disclaimer, the term of this patent is extended or adjusted under 35 U.S.C. 154(b) by 79 days.

(21) Appl. No.: 13/987,908

(22) Filed: Sep. 16, 2013

(65) Prior Publication Data

US 2015/0080061 A1 Mar. 19, 2015

(51) Int. Cl.
*H04M 1/00* (2006.01)
*H04M 1/60* (2006.01)

(52) U.S. Cl.
CPC .................................. *H04M 1/6066* (2013.01)

(58) Field of Classification Search
USPC ........... 455/415, 41.1, 41.2, 66.1, 550.1, 563, 455/567, 569.1, 569.2, 575.1, 347, 351; 2/421
See application file for complete search history.

(56) References Cited

U.S. PATENT DOCUMENTS

| | | | |
|---|---|---|---|
| 6,015,160 A | 1/2000 | Spector | |
| 6,225,584 B1 | 5/2001 | Ase et al. | |
| 6,311,052 B1 | 10/2001 | Lenz | |
| 7,062,301 B1 | 6/2006 | Dieringer | |
| 7,203,525 B2 | 4/2007 | Dieringer | |
| 7,907,975 B2 * | 3/2011 | Sakamoto et al. | 455/569.2 |
| 2003/0026440 A1 | 2/2003 | Lazzeroni et al. | |
| 2004/0235429 A1 | 11/2004 | Garavaglia et al. | |
| 2010/0095439 A1 * | 4/2010 | Nolan et al. | 2/421 |
| 2012/0077438 A1 * | 3/2012 | Jung | 455/41.2 |
| 2013/0217370 A1 * | 8/2013 | Gerald et al. | 455/415 |

* cited by examiner

*Primary Examiner* — Thanh Le
(74) *Attorney, Agent, or Firm* — Michael E. McKee (57) ABSTRACT

A communication system for a user having a helmet including earphones and a microphone and including a two-way radio and a microphone-including unit carried by the user and connected to the two-way radio includes a sensor for sensing the presence of the user's head within the helmet. A transmitter associated with the sensor transmits a wireless signal to the microphone-including unit which enables the microphone-including unit to wirelessly receive voice-carrying signals transmitted from the helmet microphone for conductance to the two-way radio and enables the microphone-including unit to wirelessly transmit voice-carrying signals which are received by the microphone-including unit from the two-way radio to the helmet earphones. In addition, helmet-carried componentry permits the user to simultaneously communicate through the two-way radio and a bluetooth enabled cell phone.

16 Claims, 3 Drawing Sheets

COMMUNICATION SYSTEM FOR HELMETED USER

BACKGROUND OF THE INVENTION

This invention relates generally to communication systems for use by a helmeted individual and relates, more particularly, to various operating capabilities and characteristics of such a system.

The class of communication systems with which this invention is to be compared includes those which are utilized by helmet-wearing riders of power sports equipment, such as a motorcycle, in police, rescue or military environments. It is common, for example, that a motorcycle-riding policeman carries a portable (e.g. belt-mounted) two-way radio for purposes of communicating with other police personnel and wherein the radio is switched between a talk mode (which enables voice messages from the rider to be transmitted from the radio) and a non-talk (or listen) mode during system operation. In addition, the rider may utilize a microphone-including unit or arrangement (or "speakermic") capable of being mounted upon the shirt (e.g. the lapel) of the rider's clothing through which voice messages are transmitted from the rider to the portable radio or through which voice-carrying signals which are picked up by his radio are emitted in the form of audible messages while the portable radio remains attached to the belt of the rider.

It is known that the helmet of such a rider can be equipped with a communications assembly having a headset, including a microphone and at least one speaker, which is connectable to the rider's microphone-including unit for transmission of voice-carrying signals therebetween. Since the speaker (or speakers) of such an assembly is situated near the ear (or ears) of the rider when the helmet is worn and the microphone of such an assembly is situated near the mouth of the rider when the helmet is worn, communication to and from the rider is much easier than would be the case if the rider must speak into or hear audible messages from a lapel-mounted microphone-including unit.

Heretofore, the helmet-mounted communications assembly has been physically connected to the microphone-including unit of the rider by way of a cable in order to render the system operable. This cable connection has necessitated that after the rider places his helmet on his head, he must plug a cable (which typically leads from the helmet-mounted assembly) into a jack-accepting receptacle provided in the microphone-including unit. Similarly and in order to completely remove the helmet from the rider's person, the helmet must be removed from the rider's head and the cable must be disconnected from the jack-accepting receptacle of the unit.

It would be desirable to provide such a communication system of the aforedescribed class which employs both a microphone-including unit and a helmet-mounted communications assembly which does not require that the helmet-mounted communications assembly be physically connected to the microphone-including unit in order for voice-carrying signals to be passed therebetween.

Accordingly, it is an object of the present invention to provide a new and improved communication system for a helmeted user who utilizes a two-way radio and a microphone-including unit.

Another object of the present invention is to provide such a communication system which obviates the need to physically connect the helmet-mounted communications assembly to the microphone-including unit for the purpose of transmitting voice-carrying signals therebetween.

Still another object of the present invention is to provide such a communication system whose operation is enabled or controlled upon a sensed presence of the rider's head within his helmet.

Yet another object of the present invention is to provide such a communication system whose helmet-mounted communications assembly is capable of receiving and transmitting cell phone signals thereby enabling the user to hear and send voice messages through a cell phone in addition to the communication which can be simultaneously had through the two-way radio.

A further object of the present invention is to provide such a system which is uncomplicated in structure, yet effective in operation.

SUMMARY OF THE INVENTION

This invention resides in an improvement in a communication system for a user having a helmet and including a two-way radio which is capable of being switched between a talk mode and a non-talk mode and further including a microphone-including unit capable of being carried by the user and which is connected to the two-ray radio for conductance of voice-carrying signals between the microphone-including unit and the two-way radio and wherein the helmet includes a communications assembly having a speaker and a microphone through which voice-carrying signals are transmitted between the user and the microphone-including unit.

The improvement is characterized in that the communications assembly includes a sensor for sensing the presence of the head of the user within the helmet and means associated with the sensor for transmitting a wireless signal to the microphone-including unit which enables the microphone-including unit to wirelessly receive voice-carrying signals transmitted from the microphone of the communications assembly for subsequent conductance to the two-way radio and enables the microphone-including unit to wirelessly transmit voice-carrying signals which are received by the microphone-including unit from the two-way radio to the speaker of the communications assembly.

DETAILED DESCRIPTION OF AN ILLUSTRATED EMBODIMENT

Figure 1:
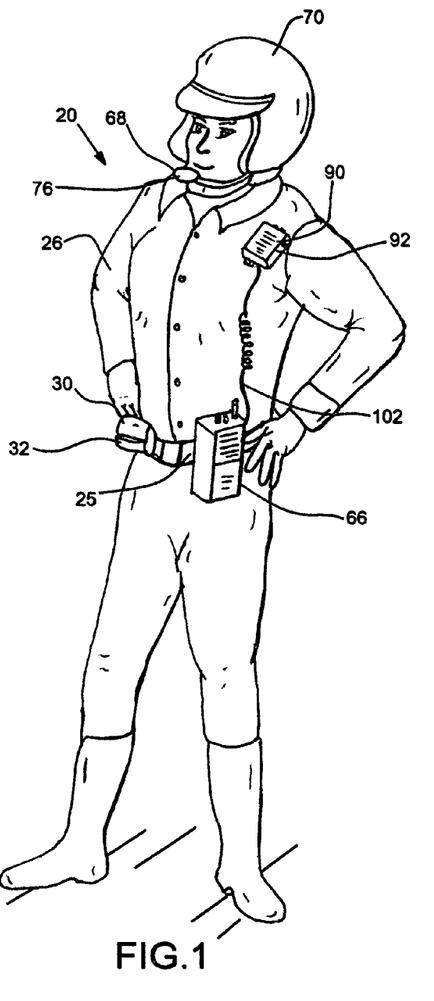
FIG. 1 is a perspective view of a helmeted motorcycle-riding law enforcement officer and various items of the officer's communication equipment within which features of the present invention are embodied.

Turning now to the drawings in greater detail and considering first FIG. 1, there is illustrated a communication system, generally indicated 20, within which features of the present invention are embodied and shown being utilized by a helmeted user 26. The depicted FIG. 1 user 26 is a helmeted motorcycle rider, such as a policeman, and the communication system 20 includes a set of components, described herein, which are attached to and carried by the body of the rider 26, and another set of components, described herein, which are mounted within a helmet 70 which, in turn, is adapted to be worn upon the head of the rider 26. More specifically, one set, indicated 22 in FIG. 2, of components of the communication system 20 being carried by the rider 26 includes a two-way portable radio 66 and a microphone-including unit 90, and another set, indicated 24 in FIG. 3, of components of the system 20 includes a communications assembly 68 which are mounted within the rider's helmet 70. As will be apparent herein, the control of various operating characteristics of the two-way radio 66 and the microphone-including unit 90 can be had by placing the helmet 70 upon the head of the rider 26 or removing the helmet 70 from the head of the rider 26.

In addition and with reference again to FIG. 1, a bluetooth enabled cell phone 30 is positioned within a belt-mounted case 32 enabling the cell phone 30 to be conveniently carried by the rider 26.

Figure 2:
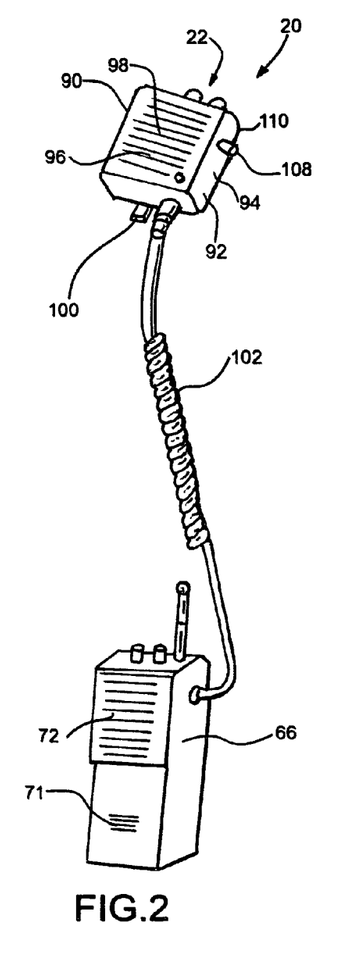
FIG. 2 is a perspective view which illustrates schematically various items of the communication equipment carried upon the body of the officer of FIG. 1.

With reference to FIGS. 1 and 2, the portable two-way radio 66 is adapted to be attached to, and thus carried upon, a belt 25 which is positioned about the waist of the rider 26, and the structure and operation of the radio 66 are well known in the art. Briefly, the portable radio 66 is a self-contained unit which, if operating in a talk mode, can be used to wirelessly transmit voice messages which are spoken into an internal microphone 71 of the radio 66 by the rider 26 to a remote site. In the alternative and if operating in a non-talk, or listen, mode, the radio 66 is adapted to receive wireless voice-carrying signals which are transmitted from a remote site to the radio 66 and subsequently broadcast audible voice messages which correspond to those voice-carrying signals through an internal speaker 72 of the radio 66 for the rider 26 to hear. There exists manual mode-switching controls (e.g. a PTT, or push-to-talk) switch mounted upon the body of the radio 66 enabling a user to switch the radio 66 between its talk and non-talk modes, but as will be apparent herein, when the microphone-including unit 90 has been connected to the radio 66, the operating modes of the radio 66 can be controlled by way of a switch associated with the microphone-including unit 90. To accommodate the connection between the microphone-including unit 90 and the radio 66, the radio 66 is adapted to accept one end of a cable 102 leading from the microphone-including unit 90.

With reference to FIG. 2, the microphone-including unit 90 of the communication system 20 is adapted to be carried by the rider 26 for emitting voice-carrying signals to the portable radio 66 for wireless transmission therefrom. Within the depicted communication system 20, the microphone-including unit 90 is in the form of a combination speaker and microphone unit 92 having a body 94 within which is housed a microphone 96 and a speaker 98. Mounted upon the back of the body 94 of the unit 92 is a clip 100 or similar attachment means enabling the unit 92 to be clipped to the shirt (e.g. the lapel thereof) of the rider 26 adjacent the rider's chest or shoulder area. The unit 92 is connectable to the portable radio 66 by way of the cable 102, introduced earlier. The cable 102 conducts operating power to the unit 92 from the portable radio 66 and conducts, when necessary, voice-carrying signals between the unit 92 and the radio 66. The speaker and microphone unit 92 cooperates with the portable radio 66 in a manner which transfers preselected functions of the radio 66 to the chest or shoulder area of the rider 26. In other words, the unit 92 obviates any need for the rider 26 to remove the radio 66 from his belt 25 and thereafter hold the radio 66 adjacent his head to either speak into the radio microphone 71 for subsequent broadcast therefrom or to hear voice messages emitted from the radio speaker 72. To this end and as is known in the art, internal componentry within the portable radio 66 is capable of sensing the connection of the cable 102 to the radio 66 and thereby enables voice messages which are spoken into the microphone 96 of the unit 92 (or into the microphone 76 of the helmet-mounted communications assembly 68, as will be described herein), during the talk mode of the radio 66, to be conducted to the radio 66 in the form of voice-carrying signals where they are wirelessly transmitted therefrom to a remote site and further enables voice-carrying signals which are received by the radio 66 from a remote source, during the non-talk or listen mode of the radio 66, to be conducted to the unit 92 for subsequent transmission from the speaker 98 (or into the earphones 74 of the helmet-mounted communications assembly 68, as will be described herein), in the form of audible voice messages which correspond to the voice-carrying signals received by the radio 66.

Furthermore, the speaker and microphone unit 92 includes a manually-operable push-to-talk (PTT) switch 108 which enables the rider to manually switch the radio 66 between its talk mode and its non-talk mode. To this end and with reference to FIGS. 2 and 4, the manually-operable switch 108 includes a depressible switch button 110 which is mounted on the side of the body 94 of the unit 92 and which is movable between extended and depressed conditions relative to the side of the unit 92 for controlling the operating mode of the portable radio 66. More particularly, the switch button 110 is spring-biased from a depressed condition to a normally-extended condition so that by depressing the button 110 on the side of the unit 92 from its extended condition to its depressed condition, the portable radio 66, as well as the unit 92, is switched by way of an internal (normally-open) switch mechanism 113 from a normal non-talk, or listen, mode to a talk mode. More specifically, the actuation of the switch 113 triggers a relay switch 220 and thereby activates the PTT input of the portable radio 66. Therefore, it follows that the depression of the manual switch button 110 of the PTT switch 108 permits voice-carrying signals which originate at the unit microphone 96 to be conducted to the portable radio 66 for transmission therefrom to a remote site. It also follows that the radio 66 and unit 92 will remain in the talk mode as long as the button 110 remains depressed.

Figure 4:
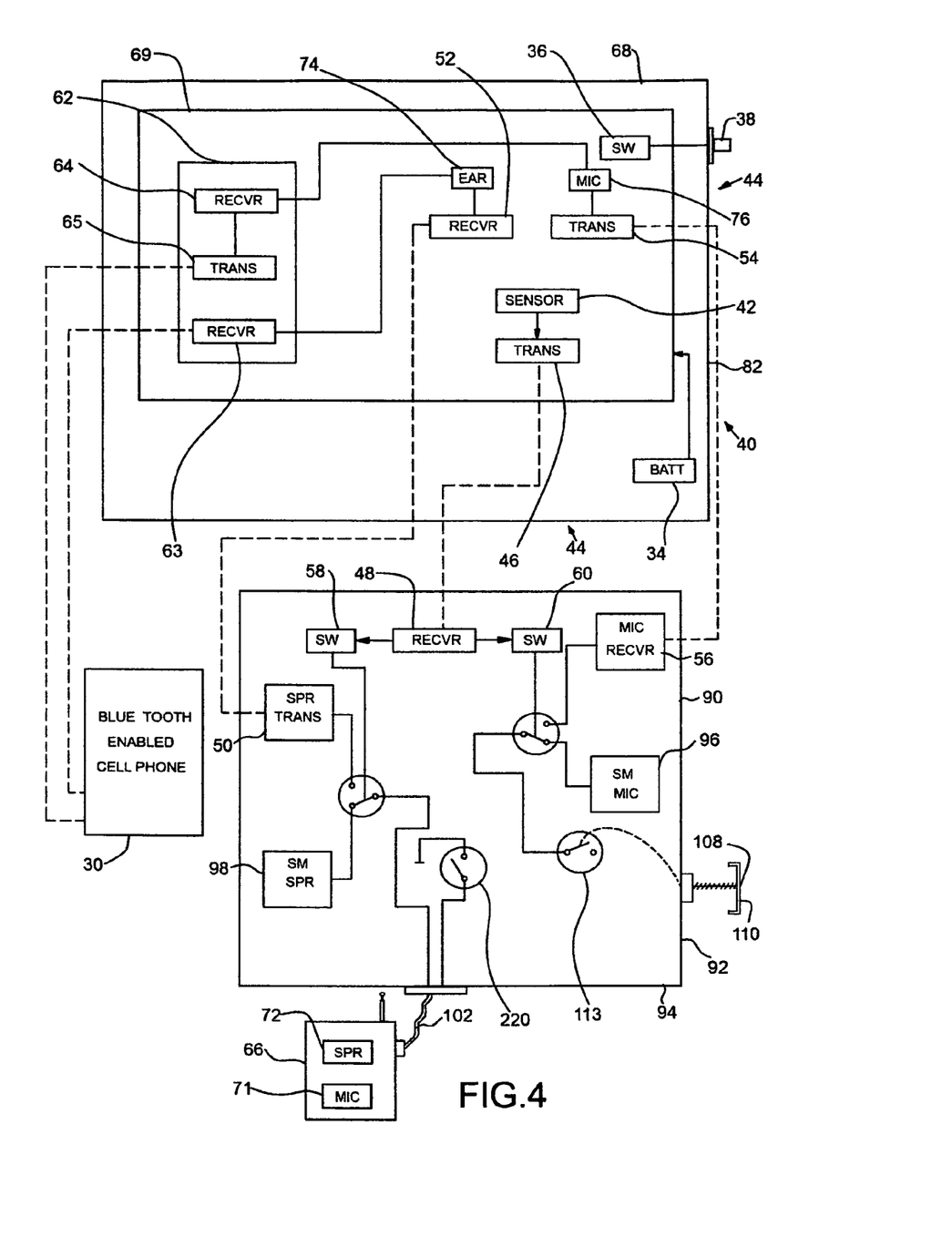
FIG. 4 schematically illustrates in block diagram form the operation of the FIG. 1 communication equipment when used to pass voice messages between the officer and his belt-mounted two-way radio and when used to communicate through a belt-mounted cell phone by way of the communications assembly mounted within the officer's helmet.

Conversely, upon release of the switch button 110 of the PTT switch 108, the button 110 is permitted to return (under the influence of an internal spring) to its extended condition so that the switch mechanism 113 returns to its normally-open condition and so that the radio 66 and unit 92 return to the non-talk, or listen, mode.

With reference again to FIG. 3, the helmet-mounted communications assembly 68 includes a headset 84 including two (e.g. a left and a right) earphones 74 which are adapted to be positioned in registry with the ears of the rider 26 when the helmet 70 is worn and a microphone 76. A suitable harness 78 which is positioned within the helmet 70 supports the microphone 76 adjacent the mouth of the rider 26 when the helmet 70 is worn so that voice messages which are spoken by the rider 26 are picked up by the microphone 76. The earphones 74 and microphone 76 are connected to a helmet-mounted control unit 82 (described herein) through which voice-carrying signals are transmitted between the helmet 70 and the microphone-including unit 90. When the communications assembly 68 is in use and the helmet 70 is positioned upon the head of the rider 26, the earphones 74 permit the rider 26 to hear messages received by the portable radio 66, and the microphone 76 is adapted to transmit voice messages spoken by the rider 26 to the portable radio 66 for wireless transmission of corresponding voice-carrying signals therefrom.

With reference again to FIG. 4, the operating power for the helmet-mounted communication assembly 68 is withdrawn from a battery 34 mounted within the control unit 82, and there is wired into the circuit of the control unit 82 a switch mechanism 36 having a manually-actuated switch for energizing the control unit 82 from the battery 34 or cutting off the power from the battery 34. More specifically, the switch mechanism 36 is manually actuated by way of a two-way position ON/OFF switch 38 mounted upon the side of the control unit 82. Therefore, when it is desired to activate the communications assembly 68 and thus activate the assembly, indicated 69, of components thereof, the rider 26 shifts the two-position ON/OFF switch 38 to its ON position. Conversely and in order to de-activate the assembly 68 (and thus conserve battery energy), the rider 26 shifts the two-position ON/OFF switch 38 to its OFF position.

Figure 3:
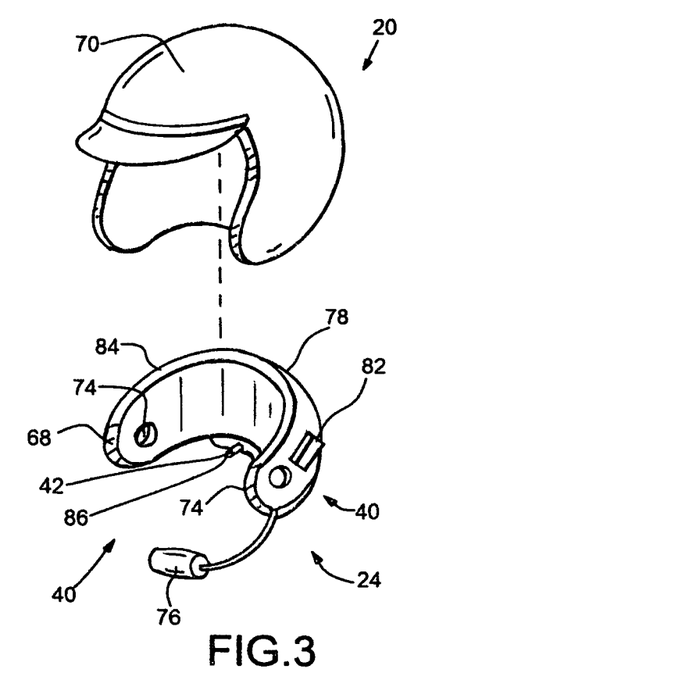
FIG. 3 is an exploded perspective view which illustrates schematically various items of the communication equipment mounted within the helmet worn upon the head of the officer of FIG. 1.

It is a feature of the present invention that the communication system 20 includes means, generally indicated 40 in FIGS. 3 and 4, for sensing the physical presence of the head of the rider 26 when the helmet 70 is placed upon the head of the rider 26 for overriding, or switching, various functions of the microphone 96 and the speaker 98 of the unit 92 and transferring the corresponding functions to the microphone 76 and earphones 74 of the communications assembly 68 so that voice-carrying signals which are conducted from the radio 66 to the microphone-including unit 90 are transmitted wirelessly to the common assembly 68 and so that voice-carrying signals (corresponding to voice messages spoken by the rider 26) emitted from the microphone 76 are transmitted wirelessly to the microphone-including unit 90 where they are subsequently conducted to the radio 66 for transmission to a remote site.

Within the depicted system 20, the head-sensing means 40 is a component of the control unit 82 of the communications assembly 68 and includes a sensor unit 42 which is mounted within the interior of the helmet 70 and adjacent the back thereof for sensing the presence of the rider's head within the helmet interior when the helmet 70 is placed upon the rider's head. The sensor unit 42 depicted in FIG. 3 is in the form of a mechanical-type switch 86 having a plunger which is moved from an extended condition to a depressed condition upon engagement with the head when the helmet 70 is placed upon the head, but other forms of switches, such as proximity or capacitance-based sensors, can be utilized. In either event, the sensor unit 42 is adapted to sense the presence of the rider's head within the interior of the helmet 70 when the helmet 70 is placed upon the rider's head, and associated componentry (described herein) which is incorporated within the control unit 82 sends appropriate signals to the microphone-including unit 90 for overriding functions of the microphone-including unit 90 as aforedescribed.

Within the depicted communication system 20 and with reference again to FIG. 4, the control unit 82 of the helmet-mounted communications assembly 68 includes the head-sensing sensor unit 42, introduced earlier, and transmitting means, generally indicated 44, including a transmitter 46, for transmitting a wireless switching signal to the microphone-including unit 90 which mutes, or de-energizes, the microphone 96 and speaker 98 of the microphone-including unit 90. To this end, the microphone-including unit 90 includes a receiver 48 for wirelessly receiving the switching signal emitted from the transmitter 46 and making the desired switching of the operating characteristics of the microphone-including unit 90.

In connection with the foregoing, the microphone-including unit 90 includes a transmitter 50 which is adapted to wirelessly transmit voice-carrying signals which are conducted to the microphone-including unit 90 from the radio 66 to the earphones 74 of the helmet-mounted communications assembly 68, and there is associated with the earphones 74 a receiver 52 which is connected to the earphones 74 for wirelessly accepting the voice-carrying signals emitted from the transmitter 50. Similarly, there is associated with the microphone 76 of the communications assembly 68 a transmitter 54 which is connected to the microphone 76 for wirelessly transmitting the voice-carrying signals (corresponding to the words spoken by the helmeted rider 26 into the microphone 76), and the microphone-including unit 90 includes a receiver 56 (which is connectable to the portable radio 66) for wirelessly accepting the voice-carrying signals emitted from the transmitter 74.

With reference still to FIG. 4 and when the helmet 70 is placed upon the head of the rider 26, the sensor 42 senses that occurrence, and the associated transmitter 46, in response to the sensed presence of the rider's head within the helmet interior, sends a wireless signal toward the microphone-including unit 90 which is received by the receiver 48. Upon receipt of this received signal, the receiver 48 initiates the switching of two switches 58 and 60 which switch the operation of the microphone-including unit 90 from a normal mode—during which voice-carrying signals which are conducted to the unit speaker 98 from the radio 66 and are emitted therefrom in the form of audible voice messages and during which voice-carrying signals which originate at the unit microphone 96 (and which correspond to voice messages spoken into the microphone 96) and which are subsequently conducted to the radio 66 for transmission to a remote site—to a helmet-involving mode during which voice-carrying signals which are conducted to the unit 90 from the radio 66 are routed to the transmitter 50 where they are transmitted wirelessly to the helmet-mounted receiver 52 and subsequently emitted from the earphones 74 as audible voice messages for the rider 26.

In connection with the foregoing, one switch 58 is connected between the radio 66 and the unit speaker 98 and between the radio 66 and the transmitter 50 so that, when the unit 90 is switched by the receiver 98 from its normal mode of operation (during which the helmet 70 is not involved) to its helmet-involving mode, the conductor path between the unit speaker 98 and the radio 66 is broken, and a conductor path is made between the radio 66 and the transmitter 50 so that voice-carrying signals which are conducted from the radio 66 to the microphone-including unit 90 are no longer emitted from the unit speaker 98 as audible messages and are instead transmitted wirelessly from the unit 90 by way of the transmitter 50 to the helmet-mounted receiver 52 where they are picked up and subsequently emitted from the earphone 74 as audible messages.

By comparison, the other switch 60 is connected between the radio 66 and the unit microphone 96 and between the radio 66 and the receiver 56 so that when the unit 90 is switched by the receiver 46 from its normal (i.e. non-helmet-involving) mode of operation to its helmet-involving mode, the conductor path between the radio 66 and the unit microphone 96 is broken and a conductor path is made between the radio 66 and the unit receiver 56 so that voice-carrying signals (which correspond to voice messages spoken by the rider 26) are no longer conducted to the radio 66 from the unit microphone 96 and are instead conducted to the radio 66 from the unit receiver 56 after the receiver 56 wirelessly accepts the voice-carrying signals from the helmet-mounted transmitter 54 which corresponds to voice messages spoken by the rider 26 into his helmet-mounted microphone 76.

It will be understood that whether the radio 66 sends voice-carrying signals to the speaker 98 of the microphone-including unit 90 or to the earphones 74 of the helmet-mounted communications assembly 68 or receives voice-carrying signals from the microphone 96 of the microphone-including unit 90 or from the microphone 76 of the helmet-mounted communications assembly 68, the radio 66 must be switched between its talk mode and non-talk (or listen) mode. To this end and as mentioned earlier, the radio 66 is normally in its non-talk, or listen, mode as long as the button 110 of the PTT switch 108 remains in its extended condition. In its non-talk mode, the radio 66 is in condition for transmitting voice-carrying signals to either the unit speaker 98 or to the helmet-mounted earphones 74, depending upon the position, or condition, of the unit switch 58. Therefore, whether the voice-carrying signals conducted to the unit 90 from the radio 66 are heard through the unit speaker 98 or through the helmet-mounted speaker earphones 74 depends upon whether the helmet 70 is positioned upon the rider's head or, in other words, the sensor 42 senses the presence of the rider's head within the interior of the helmet 70. In short, if the helmet 70 is removed from (or not positioned upon) the rider's head, audible messages intended for the rider 26 (by way of the two-way radio 66) are heard through the unit speaker 98, but if the helmet 70 is positioned upon the rider's head, audible messages intended for the rider 26 (by way of the two-way radio 66) are heard through the helmet-mounted earphones 74.

By comparison, if the radio 66 is desired to be switched from the non-talk mode to its talk mode, the button 110 of the PTT switch 108 is depressed to activate the PTT input of the portable radio 66, as described earlier, so that voice-carrying signals which originate at the unit microphone 96 or the helmet-mounted microphone 76 (depending upon the position of the switch 60) are conducted to the radio 66 for subsequent transmission to a remote site. Therefore, whether the rider's voice messages which are conducted to the radio 66 from the unit 90 are routed thereto by way of the unit microphone 96 or by way of the helmet-mounted microphone 76 depends upon whether the helmet 70 is positioned upon the rider's head or, more specifically, whether the sensor 42 senses the presence of the rider's head within the interior of the helmet 70. In other words, if the helmet 70 is removed from (or not positioned upon) the rider's head, the radio 66 accepts (in the form of voice-carrying signals) the voice messages spoken into the unit microphone 96, but if the helmet 70 is positioned upon the rider's head, the radio 66 accepts (in the form of voice-carrying signals) the voice messages spoken into the helmet-mounted microphone 76.

If desired, the aforementioned communication system 20 can be used in conjunction with a push-to-talk (PTT) switch which is mounted upon the handlebars of the rider's sports equipment (e.g. his motorcycle) thereby enabling the rider to switch the operating mode of the radio 66 between its talk and non-talk (or listen) modes while the rider maintains his hands about the handlebars. I have described such a handlebar-mounted PTT switch and associated control unit in my earlier U.S. Pat. Nos. 7,062,301 and 7,203,525 so that a detailed described thereof is not believed to be necessary. Suffice it to say that a hendlebar-mounted PTT switch can be utilized with the communication system 20 described herein to enable the rider to control the operating characteristics of the communication system 20 (i.e. the switching of a radio between its talk and non-talk modes) as the hands of the rider remains positioned about the handlebars of his power sports equipment. Along the same lines, another PTT switch can be mounted upon the microphone-including unit 90 or upon the handlebars of the power sports equipment to enable the rider 26 to conveniently send voice messages to a public address (PA) system mounted in his power sports equipment. For a more detailed description of the control of operating characteristics of a communication system by way of handlebar-mounted PTT switches or the utilization if a communication system with a motorcycle-carried public address system, reference can be had to my earlier U.S. Pat. Nos. 7,062,301 and 7,203,525, the disclosures of which are incorporated herein by reference.

With reference to FIGS. 3 and 4, the depicted communication system 20 also includes componentry, generally indicated 62 in FIG. 4, which is incorporated within the control unit 82 (and thus mounted within the rider's helmet 70) and which enables the rider 26 to communicate through his belt-carried, bluetooth enabled cell phone 30 without removing the cell phone 30 from his belt 25. In other words, the unit componentry 62 is coded to the cell phone 30 for the purpose of receiving (at the helmet 70) voice-carrying signals which are transmitted to the cell phone 30 and for transmitting voice-carrying signals (which correspond to the voice messages spoken by the rider 26) from the helmet 70 to the cell phone 30. The structure and operation of the bluetooth enabled cell phone 30 is well known in the art so that a detailed description thereof is not believed to be necessary. For use of the communications assembly 68 with the cell phone 30, the unit componentry 82 includes a receiver 63 which wirelessly receives and conducts voice-carrying cell phone signals to an appropriate speaker and a receiver 64 for accepting voice-carrying signals (corresponding to the voice messages spoken into an appropriate microphone) and an associated transmitter 65 which transmits the accepted signals to the belt-mounted cell phone 30.

Within the depicted communication system 20, the aforedescribed componentry 62 is incorporated within the helmet-mounted communications assembly 68 and its receiver 63 is appropriately wired to the earphones 74 of the rider 26 so that cell phone messages received by the receiver 63 from the cell phone 30 are conducted to the earphones 74 from which audible messages (i.e. corresponding to the voice-carrying signals received by the receiver 63 are heard by the rider 26. Similarly, the receiver 64 of the unit componentry 62 is appropriately connected to the helmet-mounted microphone 76 for accepting voice-carrying signals (corresponding to voice messages spoken by the rider 26) from the microphone 76, and the transmitter 65 transmits the accepted voice-carrying signals to the cell phone 30 from which the signals are transmitted to a remote site.

Because the receivers 63 and 64 of the unit componentry 62 are connected to the helmet-mounted earphones 74 and microphone 76 as aforedescribed, the communication assembly 68 is in condition for passing voice-carrying signals between the belt-mounted cell phone 30 and the helmet-mounted earphones 74 or between the helmet-mounted microphone 76 to the cell phone 30 by way of the unit componentry 62 while the helmet 70 is worn by the rider 26. Moreover and because the unit componentry 62 is incorporated within the helmet-mounted communications assembly 68 as aforedescribed, the rider 26 can communicate through the bluetooth enabled cell phone 30 while remaining in communication with the radio 66. In other words and because the earphones 74 are adapted to receive signals from both the receiver 63 of the unit componentry 62 and the receiver 52 of the control unit 82, the rider 26 can listen to messages from either the bluetooth enabled cell phone 30 and the radio 66 through the earphones 74. Similarly, the microphone 76 is adapted to transmit voice messages (in the form of voice-carrying signals) to both the receiver 64 of the unit componentry 62 and the receiver 56 of the control unit 82. This arrangement is advantageous in that while the rider 26 is in communication with another party through the bluetooth enabled cell phone 30, he remains open to communications received through the radio 66, and vice-versa.

Because the communication system 20 described herein does not require that any cable or wire be connected between the rider 26 and his microphone-including unit 90, the rider can, if he desires, don or remove his helmet 70 without having to remember to connect or disconnect any wires or cables which might otherwise be required to physically join the helmet-mounted communications assembly 68 to the rider's shirt-worn microphone-including unit 90 for communication therebetween. Consequently, the communication system 20 described herein obviates any likelihood that the rider will remove and store his helmet 70 and thereafter be jerked back toward the stored helmet 70 or become entangled within wires or cables which may otherwise join the helmet 70 to his shirt-mounted microphone-including unit 90.

It also follows that the communication system 20 is well-suited for use by law enforcement or rescue personnel who are expected to operate a two-way radio as the personnel rides a motorcycle or other power sports equipment, such as an all-terrain vehicle (ATV) or a snowmobile. Accordingly, the principles of the present invention can be applied to any of a number of environments.

Figure 5:
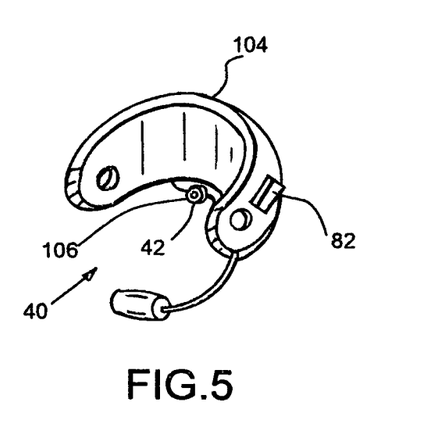
FIG. 5 is a perspective view of a fragment of an alternative headset which can be mounted within the helmet worn upon the head of the officer of FIG. 1.

It will be understood that numerous modifications and substitutions can be had to the aforedescribed embodiment 20 without departing from the spirit of the invention. For example and as mentioned earlier, although the depicted sensor unit 42 of the head-sensing means 40 of FIG. 3 is in the form of a mechanical-type switch 86 which is actuated upon contact with the rider's head, the head-sensing means 40 can take an alternative form. For example, there is depicted in FIG. 5 an alternative embodiment of a headset 104 of a helmet-mounted communication assembly which embodies features of the present invention and whose head-sensing means 40 is in the form of a capacitance-based sensor 106 which is adapted to sense the proximity of the rider's head to the sensor 106. In practice, the sensor 106 senses the proximity of the rider's head to the sensor 106 only when the rider's head is positioned within the helmet interior. Accordingly, the aforedescribed embodiment 20 is intended for the purpose of illustration and not as limitation.

The invention claimed is:

1. In a communication system for a user having a helmet and including a two-way radio which is capable of being switched between a talk mode and a non-talk mode and further including a microphone-including unit capable of being carried by the user and which is connected to the two-ray radio for conductance of voice-carrying signals between the microphone-including unit and the two-way radio and wherein the helmet includes a communications assembly having a speaker and a microphone through which voice-carrying signals are transmitted between the user and the microphone-including unit, the improvement comprising:

the communications assembly includes a sensor for sensing the presence of the head of the user within the helmet and means associated with the sensor for transmitting a wireless signal to the microphone-including unit which enables the microphone-including unit to wirelessly receive voice-carrying signals transmitted from the microphone of the communications assembly for subsequent conductance to the two-way radio and enables the microphone-including unit to wirelessly transmit voice-carrying signals which are received by the microphone-including unit from the two-way radio to the speaker of the communications assembly.

2. The improvement as defined in claim 1 wherein the helmet has an interior and the sensor is adapted to either contact or sense the proximity of the user's head within the interior of the helmet.

3. The improvement as defined in claim 1 wherein the microphone-including unit includes a speaker to which voice-carrying signals are conducted from the two-way radio and from which the voice-carrying signals which are conducted from the two-way radio are emitted as audible messages and further includes a transmitter for transmitting voice-carrying signals which are conducted from the two-way radio to the microphone-including unit; and wherein the microphone-including unit includes means for receiving the wireless signal transmitted by the associated means and further includes a first switch which is actuated upon receipt by the signal-receiving means of the wireless signal transmitted by the associated means and which, when actuated, routes voice-carrying signals which are conducted from the two-way radio toward the speaker of the microphone-including unit to the transmitter of the microphone-including unit for subsequent wireless transmission to the speaker of the communications assembly.

4. The improvement as defined in claim 1 wherein the microphone-including unit includes a microphone from which voice-carrying signals which correspond to messages spoken into the microphone of the microphone-including unit are conducted to the two-way radio for transmission therefrom; and wherein the microphone-including unit includes means for receiving the wireless signal transmitted by the associated means and further includes a second switch which is actuated upon receipt by the signal-receiving means of the wireless signal transmitted by the associated means and which, when actuated, routes voice-carrying signals which are wirelessly received by the microphone-including unit from the microphone of the communications assembly to the two-way radio for transmission therefrom.

5. The improvement as defined in claim 1 wherein the microphone-including unit includes a speaker to which voice-carrying signals are conducted from the two-way radio and from which the voice-carrying signals which are conducted from the two-way radio are emitted as audible messages and further includes a transmitter for transmitting voice-carrying signals which are conducted from the two-way radio to the microphone-including unit; and the microphone-including unit further includes a microphone from which voice-carrying signals which correspond to messages spoken into the microphone of the microphone-including unit are conducted to the two-way radio for transmission therefrom to a remote site; and the microphone-including unit includes means for receiving the wireless signal transmitted by the associated means, a first switch which is actuated upon receipt by the signal-receiving means of the wireless signal transmitted by the associated means and which, when actuated, routes voice-carrying signals which are conducted from the two-way radio toward the speaker of the microphone-including unit to the transmitter of the microphone-including unit for wireless transmission to the speaker of the communications assembly; and the microphone-including unit includes a second switch which is actuated upon receipt by the signal-receiving means of the wireless signal transmitted by the associated means and which, when actuated, routes voice-carrying signals which are wirelessly received by the microphone-including unit from the microphone of the communications assembly to the two-way radio for transmission therefrom.

6. The improvement as defined in claim 5 wherein the microphone-including unit includes a push-to-talk (PTT) switch which, when actuated, permits voice-carrying signals which correspond to messages which are spoken into the microphone of the microphone-including unit or voice-carrying signals which correspond to messages which are spoken into the microphone of the communications assembly and which are wirelessly received by the microphone-including unit to be conducted to the two-way radio.

7. The improvement as defined in claim 1 further including a bluetooth enabled cell phone carried by the user and componentry which is incorporated within the communications assembly of the helmet for enabling the user to communicate through the bluetooth enabled cell phone, as well as through the speaker and microphone of the communications assembly.

8. The improvement as defined in claim 7 wherein said componentry includes a receiver for receiving voice-carrying signals which correspond to voice messages spoken into the microphone of the communications assembly and a transmitter for transmitting the received voice-carrying signals to the bluetooth enabled cell phone, and said componentry further includes a second receiver for wirelessly receiving voice-carrying signals transmitted thereto from the cell phone and wherein the second receiver is connected to the speaker of the communications assembly from which audible messages which correspond to the voice-carrying signals received by the second receiver are emitted.

9. In a communication system for a rider of power sports equipment having a helmet which is positionable upon the head of the rider and wherein the communication system includes a two-way radio for wireless transmission of voice-carrying signals to a remote site and for wireless receipt of voice-carrying signals from the remote site and which is capable of being switched between a talk mode and a non-talk mode and further includes a microphone-including unit which is carried by the user and which is connected to the two-way radio for conductance of voice-carrying signals therebetween, and wherein the helmet includes a communications assembly having a speaker and a microphone through which voice-carrying signals are transmitted between the rider and the microphone-including unit, the improvement characterized in that:

the communications assembly includes means for wirelessly transmitting voice-carrying signals from the microphone of the communications assembly for conductance to the two-way radio;

the microphone-including unit includes means for wirelessly transmitting voice-carrying signals which are conducted to the microphone-including unit from the two-way radio;

the communications assembly further includes means for wirelessly receiving the voice-carrying signals which are wirelessly transmitted from the wirelessly transmitting means of the microphone-including unit for conductance to the speaker of the communications assembly; and the communications assembly also includes a sensor for sensing the presence of the head of the rider within the helmet and means associated with the sensor for transmitting a wireless signal to the microphone-including unit which enables the means for wirelessly receiving of the microphone-including unit to wirelessly receive voice-carrying signals transmitted from the microphone of the communications assembly for subsequent conductance to the two-way radio and enables the means for wirelessly transmitting of the microphone-including unit to wirelessly transmit voice-carrying signals which are received by the microphone-including unit from the two-way radio to the speaker of the communications assembly.

10. The improvement as defined in claim 9 wherein the helmet has an interior and the sensor is adapted to either contact or sense the proximity of the user's head within the interior of the helmet.

11. The improvement as defined in claim 9 wherein the microphone-including unit includes a speaker to which voice-carrying signals are conducted from the two-way radio and from which the voice-carrying signals which are conducted from the two-way radio are emitted as audible messages; and wherein the microphone-including unit includes means for receiving the wireless signal transmitted by the associated means and further includes a first switch which is actuated upon receipt by the signal-receiving means of the wireless signal transmitted by the associated means and which, when actuated, routes voice-carrying signals which are conducted from the two-way radio toward the speaker of the microphone-including unit to the wirelessly transmitting means of the microphone-including unit for subsequent wireless transmission to the speaker of the communications assembly.

12. The improvement as defined in claim 9 wherein the microphone-including unit includes a microphone from which voice-carrying signals which correspond to messages spoken into the microphone of the microphone-including unit are conducted to the two-way radio for transmission therefrom; and wherein the microphone-including unit includes means for receiving the wireless signal transmitted by the associated means and further includes a second switch which is actuated upon receipt by the signal-receiving means of the wireless signal transmitted by the associated means and which, when actuated, routes voice-carrying signals which are wirelessly received by the microphone-including unit from the microphone of the communications assembly to the two-way radio for transmission therefrom.

13. The improvement as defined in claim 9 wherein the microphone-including unit includes a speaker to which voice-carrying signals are conducted from the two-way radio and from which the voice-carrying signals which are conducted from the two-way radio are emitted as audible messages and further includes a microphone from which voice-carrying signals which correspond to messages spoken into the microphone of the microphone-including unit are conducted to the two-way radio for transmission therefrom to a remote site; and the microphone-including unit includes means for receiving the wireless signal transmitted by the associated means, a first switch which is actuated upon receipt by the signal-receiving means of the wireless signal transmitted by the associated means and which, when actuated, routes voice-carrying signals which are conducted from the two-way radio toward the speaker of the microphone-including unit to the wirelessly transmitting means of the microphone-including unit for wireless transmission to the speaker of the communications assembly; and the microphone-including unit includes a second switch which is actuated upon receipt by the signal-receiving means of the wireless signal transmitted by the associated means and which, when actuated, routes voice-carrying signals which are wirelessly received by the microphone-including unit from the microphone of the communications assembly to the two-way radio for transmission therefrom.

14. The improvement as defined in claim 13 wherein the microphone-including unit includes a push-to-talk (PTT) switch which, when actuated, permits voice-carrying signals which correspond to messages which are spoken into the microphone of the microphone-including unit or voice-carrying signals which correspond to messages which are spoken into the microphone of the communications assembly and which are wirelessly received by the microphone-including unit to be conducted to the two-way radio.

15. The improvement as defined in claim 9 further including a blue tooth enabled cell phone carried by the user and componentry which is incorporated within the communications assembly of the helmet for enabling the user to communicate through the bluetooth enabled cell phone, as well as through the speaker and microphone of the communications assembly.

16. The improvement as defined in claim 15 wherein said componentry includes a receiver for receiving voice-carrying signals which correspond to voice messages spoken into the microphone of the communications assembly and a transmitter for transmitting the received voice-carrying signals to the bluetooth enabled cell phone, and said componentry further includes a second receiver for wirelessly receiving voice-carrying signals transmitted thereto from the cell phone and wherein the second receiver is connected to the speaker of the communications assembly from which audible messages which correspond to the voice-carrying signals received by the second receiver are emitted.

\* \* \* \* \*